United States Patent [19]

Jinnai et al.

[11] 4,393,385

[45] * Jul. 12, 1983

[54] CONTROLLABLE INK DROP VELOCITY TYPE INK-JET PRINTER

[75] Inventors: Koichiro Jinnai, Kawasaki; Masanori Horike, Yokohama; Kyuhachiro Iwasaki, Fujisawa; Yutaka Kodama, Tokyo, all of Japan

[73] Assignee: Ricoh Co., Ltd., Tokyo, Japan

[ * ] Notice: The portion of the term of this patent subsequent to Jan. 26, 1999, has been disclaimed.

[21] Appl. No.: 296,630

[22] Filed: Aug. 27, 1981

Related U.S. Application Data

[63] Continuation of Ser. No. 48,170, Jun. 13, 1979, Pat. No. 4,313,123.

[30] Foreign Application Priority Data

Jun. 21, 1978 [JP] Japan .................................. 53-74172

[51] Int. Cl.$^{3}$ .............................................. G01D 15/18

[52] U.S. Cl. ....................................................... 346/75

[58] Field of Search .................... 400/126; 346/140 R, 346/140 PD, 75

[56] References Cited

U.S. PATENT DOCUMENTS 4,313,123 1/1982 Jinnai et al. .......................... 346/75

*Primary Examiner*—Michael L. Gellner
*Assistant Examiner*—Todd DeBoer
*Attorney, Agent, or Firm*—Burgess, Ryan and Wayne

[57] ABSTRACT

Depending upon a position in a dot matrix where an ink drop is to be deposited, the velocity imparted to that ink drop is controlled. The ink drop is charged by a charge electrode impressed with a constant charging voltage and deflected by a pair of electrodes impressed with a constant deflection voltage so as to be placed at an given point.

1 Claim, 13 Drawing Figures

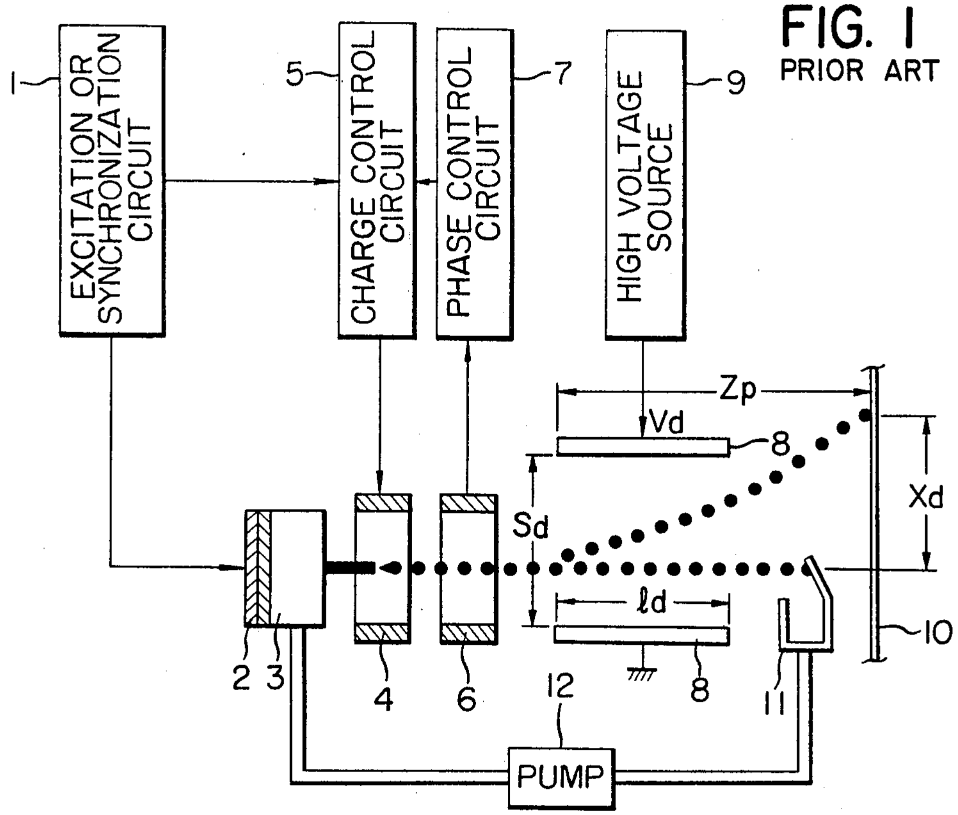
FIG. 1
PRIOR ART
FIG. 2
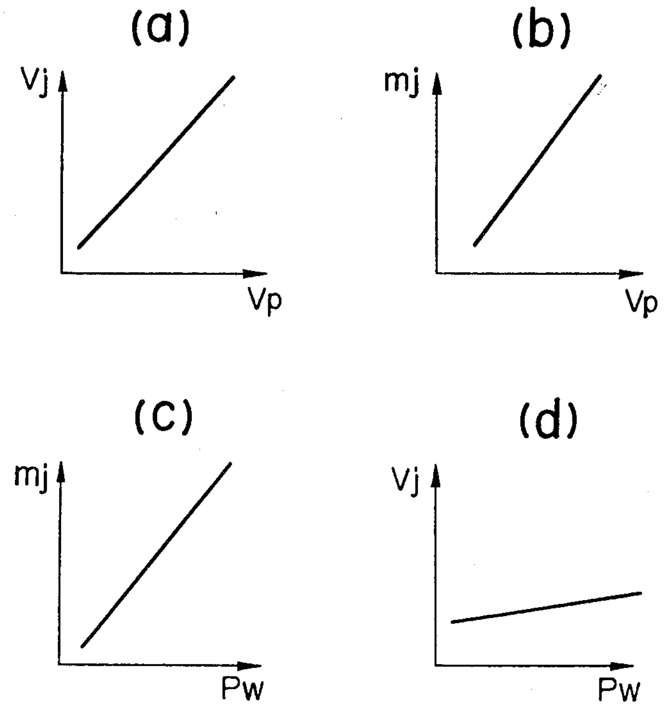

CONTROLLABLE INK DROP VELOCITY TYPE INK-JET PRINTER

This is a continuation of application Ser. No. 48,170, filed June 13, 1979, U.S. Pat. No. 06/4,313,123.

BACKGROUND OF THE INVENTION

The present invention relates to an ink-jet printer of the type wherein the velocity of an issuing ink drop is controlled depending upon a given point of a dot matrix where the ink drop is deposited.

In the prior art charge variable, deflection type ink-jet printers, the pressurized ink is supplied to an ink drop generator or an ink manifold on which is mounted a piezoelectric crystal so as to cause a pressure vibration of the ink in the ink manifold. The ink jet emerging through a nozzle of the ink drop generator breaks into ink drops in a charge electrode and the charged ink drops are deflected by a pair of deflection electrodes so as to be deposited at given positions on a recording medium.

The deflection of a charged ink drop on a recording paper from the axis of the nozzle of the ink drop generator is given by $$xd = \frac{Qj}{mj} \cdot \frac{Vd}{Sd} \cdot \frac{1}{Vj^2} \cdot ld\left(Z_p - \frac{ld}{2}\right) \quad (1)$$

where

Qj=charge on an ink drop;
mj=mass of an ink drop;
Vd=deflection voltage;
Sd=distance between the deflection electrodes;
vj=velocity of an issuing ink drop;
ld=length of the deflection electrodes; and
Zp=distance between the inlet surface of the deflection electrodes and the recording paper.

The prior art charge variable, deflection type ink-jet printers are based upon the fact that the deflection of an ink drop is in proportion to the charge Qj on that ink drop as shown in Eq. (1). That is, the charge imparted to each ink drop is controlled in response to the drop-placement signal; consequently, each charged ink drop is deposited at a given position on the recording paper. Therefore the deflection is dependent upon the charge on each ink drop.

The ink-jet printer of the type described must be therefore provided with a means for varying the charge to be imparted to an ink drop depending upon a given position in a dot matrix at which the charged drop is to be placed. In addition, the ink-jet printer needs a pump for pressurizing the ink and a means for detecting the phase at which the ink jet breaks into a stream of ink droplets.

SUMMARY OF THE INVENTION

Accordingly, one of the objects of the present invention is to provide a controllable ink drop velocity type ink-jet printer wherein the velocity of an ink drop emerging through a nozzle of an ink drop generator may be varied by controlling the amplitude and pulse duration of the exciting signal applied to a piezoelectric crystal mounted on the ink drop generator depending upon a given position in a dot matrix at which the charged ink drop is to be deposited and the ink drop is charged by a charge electrode which is impressed with a constant charging voltage and deflected by a pair of deflection electrodes across which is impressed a constant deflection voltage so that the charged ink drop may be steered to the given position.

Another object of the present invention is to provide a controllable ink-drop-velocity type ink-jet printer wherein at least one ink drop precedes a stream of ink drops required to print a given character so that misplacement of ink drops in a recording paper may be avoided.

A further object of the present invention is to provide a controllable ink-drop-velocity type ink-jet printer wherein the velocity of an issuing ink drop is controlled also depending upon whether there exists an ink drop that precedes the issuing ink drop; that is, when there exists an ink drop that precedes an ink drop emerging from the ink drop generator, the velocity of the issuing ink drop is slowed down as compared with the case where there exists no preceding ink drop, whereby the misplacement of an ink drop may be avoided.

BRIEF DESCRIPTION OF THE DRAWINGS

FIG. 1 is a diagrammatic view of a prior art electrostatic deflection type ink-jet printer;

FIG. 2 shows the graphs illustrating the relationship between the velocity Vj and mass of an ink drop and the amplitude Vp of the exciting signal applied to a piezoelectric crystal mounted on an ink drop generator and the relationship between the mass mj and velocity vj of an ink drop and the pulse duration Pw of the exciting signal;

FIG. 7(*b*) is a view used for the explanation of the mode of operation of a second embodiment of the present invention;

Same reference numerals are used to designate similar parts throughout the figures.

DESCRIPTION OF THE PREFERRED EMBODIMENTS

Prior Art, FIG. 1

Figure 3:
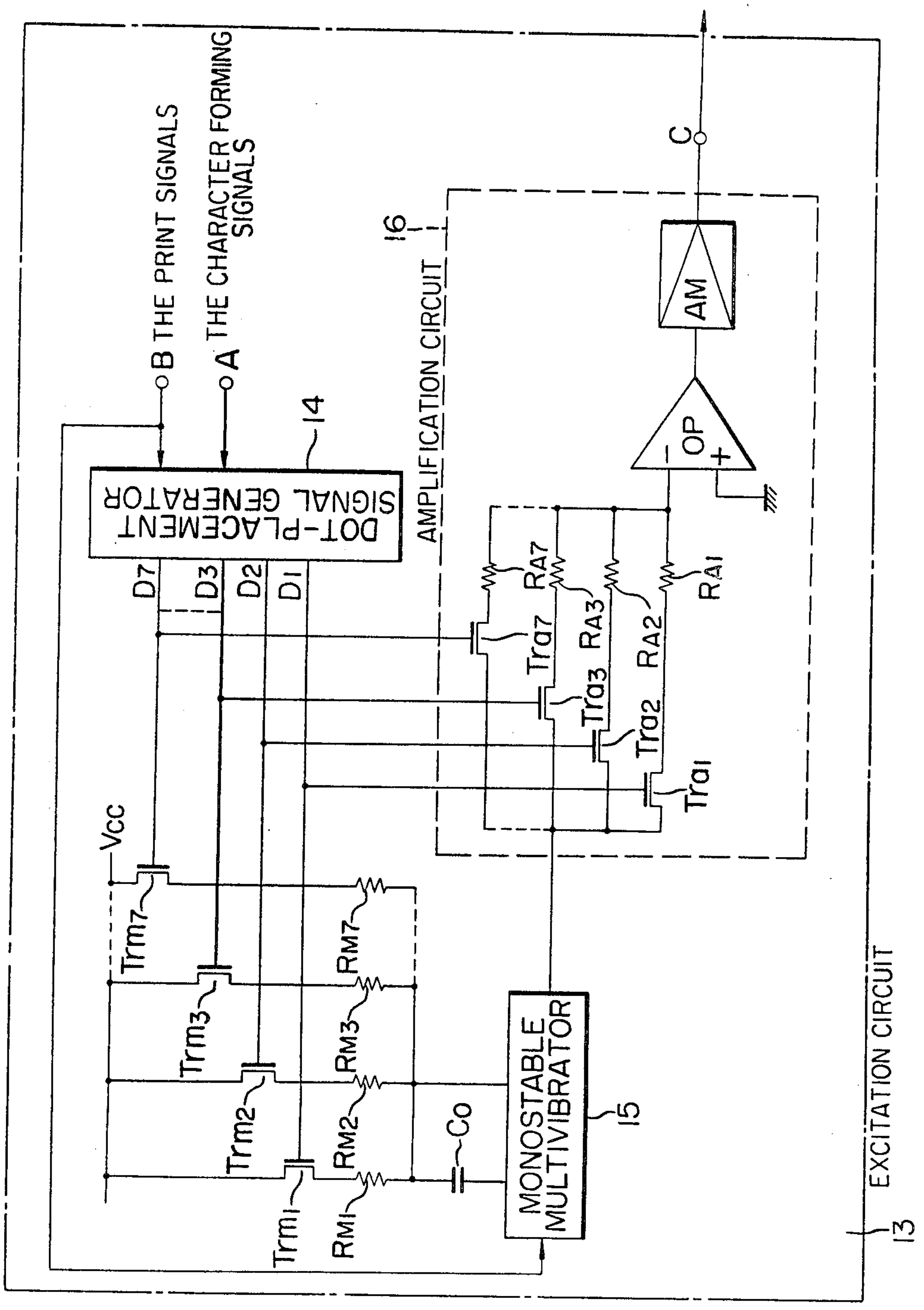
FIG. 3 is a diagram of an excitation circuit used in a first embodiment of the present invention.

In FIG. 1 is shown an example of prior art deflection type ink-jet printers which controls the charge on each ink drop. The ink-jet printer comprises an excitation or synchronization circuit 1, a piezoelectric crystal 2 mounted on a wall of an ink drop generator or an ink manifold 3, a charge electrode 4 for charging ink drops, a charge control circuit 5, a phase detecting electrode 6, a phase control circuit 7, a pair of deflection electrodes, 8 a high-voltage source 9, a recording paper 10, a gutter 11 for collecting ink drops which are not directed toward the recording paper 10 and a pump 12 for supplying the pressurized ink to the ink drop generator 3. The pressure of the pressurized ink in the ink drop generator 3 is rapidly varied by the piezoelectric crystal 2 so that the ink jet emerging through a nozzle of the ink drop generator 3 may break into ink drops. An ink drop which is charged by the charge electrode 4 is deflected by the deflection electrodes 8 so that the charge ink drop may be placed on a desired position on the recording paper 10.

The Invention

The underlying principle of the present invention is however based upon the fact that the deflection Xd of an ink drop is dependent upon the velocity Vj of that ink drop as expressed in Eq. (1). Thus the velocity of each ink drop is so controlled as to attain a desired deflection Xd.

Referring to FIG. 2, when the amplitude Vp of the exciting signal applied to the piezoelectric crystal 2 is increased, the velocity Vj of the ink jet issuing through the nozzle of the ink drop generator 3 increases as shown in FIG. 2(*a*) and so does the mass mj of the ink drop as shown in FIG. 2(*b*). When the exciting signal is decreased in pulse duration Pw, the mass of an ink drop decreases as shown in FIG. 2(*c*), but the velocity Vj of the ink drop is hardly affected as shown in FIG. 2(*d*). Therefore it follows that when the exciting signal is increased in pulse amplitude Vp but decreased in pulse duration Pw, the velocity Vj of an ink drop may be increased without causing the increases in mass mj of the ink drop and consequently the deflection Xd on the recording paper may be reduced. On the other hand, when the exciting signal is decreased in pulse amplitude Vp but increased in pulse duration Pw, the velocity of an ink drop may be decreased without causing the decrease in mass of that ink drop and consequently the deflection Xd on the recording paper may become greater.

In FIG. 3 is shown a first embodiment of a piezoelectric crystal excitation circuit in accordance with the present invention which may implement the above described underlying principle. That is, the excitation circuit controls the velocity of an ink drop depending upon an ink dot position on the recording paper to which is steered the ink drop without causing any variations in mass of ink drops. The construction and mode of operation of the excitation circuit or exciting signal generator 13 will be described in detail below with further reference to FIG. 4 which shows the waveforms of various signals processed in the excitation circuit 13 and FIG. 5 which shows a character E, only the steps for placing the ink dots in the first and second vertical lines or columns from the left being explained.

Figure 4:
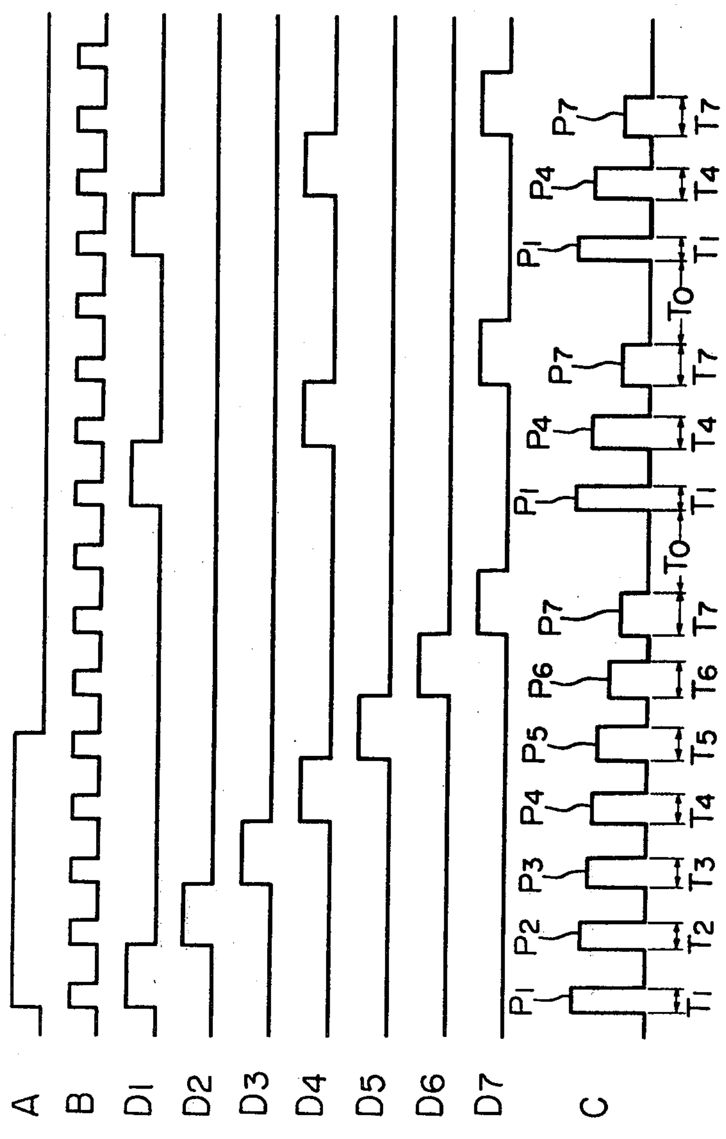
FIG. 4 shows the waveforms of various signals processed in the excitation circuit shown in FIG. 3.

The excitation circuit 13 includes an ink-dot-placement signal generator which may consist of a character generator and has a first input terminal A to which are applied the character forming signals (See FIG. 4,A) and a second input terminal B to which are applied the print signals (See FIG. 4,B). In response to a character forming signal, the dot-placement signal generator 14 delivers output pulses $D_1$–$D_7$ (See FIG. 4, $D_1$–$D_7$) to its output terminals (See FIG. 3, $D_1$–$D_7$) in synchronism with the print signal pulses B. These output pulses $D_1$–$D_7$ are applied to analog switches $Trm_1$–$Trm_7$ and $Tra_1$–$Tra_7$ so as to cause them to open.

The excitation circuit 13 further includes a monostable multivibrator 15 which is connected through a capacitor $C_0$ and resistors $R_{M1}$–$R_{M7}$ to the first analog switches $Trm_1$–$Trm_7$. The monostable multivibrator 15 generates a pulse signal which is applied to an amplification circuit 16. The pulse duration of the output pulse from the monostable multivibrator 15 is dependent upon the value of the capacitor $C_0$ and the value of one of the resistors $R_{M1}$–$R_{M7}$ which is connected to an opened one of the analog switches $Trm_1$–$Trm_7$.

The amplification circuit 16 includes the second analog switches $Tra_1$–$Tra_7$, weighting resistor $R_{A1}$–$R_{A7}$, an operational amplifier OP and an amplifier AM. The amplification circuit 16 adjusts the amplitude of the pulse signal from the monostable multivibrator 15 to a predetermined level and amplifies the pulse signal so as to be delivered to the piezoelectric crystal 2 (See FIG. 4, C).

In summary, the pulse durations of the pulse signals are determined by the values of the capacitor $C_0$ and the resistors $R_{M1}$–$R_{M7}$ while the amplitudes are determined by the weighting resistors $R_{A1}$–$R_{A7}$. These pulse signals are applied to the piezoelectric crystal 2 so that each ink drop may have the same mass and may be imparted with a velocity with which the ink drop may be steered to a predetermined ink dot position on the recording paper 10.

More particularly, in response to the pulse signal (See FIG. 4, $D_1$) delivered from the output terminal $D_1$ of the dot-placement signal generator 14 in synchronism with the print pulses B, the exciting signal $P_1$ with the pulse duration $T_1$ (See FIG. 4, C) is delivered from the amplification circuit 16 to the piezoelectric crystal 2. Therefore the ink jet issuing from the ink drop generator 3 breaks into an ink drop having a predetermined velocity with which the ink drop may be steered to a dot position $D_1$ indicated in FIG. 5. In like manner, in response to the pulse signal (See FIG. 4, $D_2$) delivered from the output terminal $D_2$ of the dot-placement generator 14 in synchronism with the print pulses B, the amplification circuit 16 delivers the exciting signal $P_2$ (See FIG. 4, C) to the crystal 2. The pulse duration of the exciting signal $P_2$ is slightly wider than that of the preceding exciting pulse signal $P_1$, but the amplitude of the signal $P_2$ is slightly lower than that of the signal $P_1$. As a result the ink jet issuing through the nozzle of the ink drop generator 3 breaks into an ink drop whose mass is substantially equal to that of the preceding ink drop and whose velocity is slower than that of the preceding frop so that the succeeding ink drop may be steered to land at a dot position $D_2$ in FIG. 5. In like manner, the exciting signals $P_3$–$P_7$ of amplitude $T_3$–$T_7$, respectively, are sequentially generated and applied to the piezoelectric crystal 2 so that the velocities imparted to the succeeding ink drops which are equal in mass are gradually decreased and consequently the ink drops are steered to land at dot positions $D_4$–$D_7$, respectively, shown in FIG. 5. Thus the first vertical line from the left of the character E has been printed.

Figure 5:
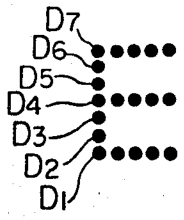
FIG. 5 shows a character "E" the printing of which is explained in the mode of operation of the first embodiment.

During a time interval $T_0$ (See FIG. 4, C), the print head (not shown) is shifted a predetermined distance in the transverse direction; that is, to the right in FIG. 5. Then the dot-placement signal generator 14 delivers only three pulse signals (See FIG. 4, $D_1$, $D_4$ and $D_7$) sequentially at predetermined time intervals in sychronism with the print pulses B, and in response to these pulse signals the amplification circuit 16 delivers the exciting pulse signals $P_1$, $P_4$ and $P_7$ as shown in FIG. 4, C. Therefore ink drops are selected and imparted with corresponding velocities so that they may be steered to land on the dot positions $D_1$, $D_4$ and $D_7$ in the second vertical line as shown in FIG. 5. In like manner, the third, fourth and fifth vertical lines are printed so that the character E is printed.

Figure 6:
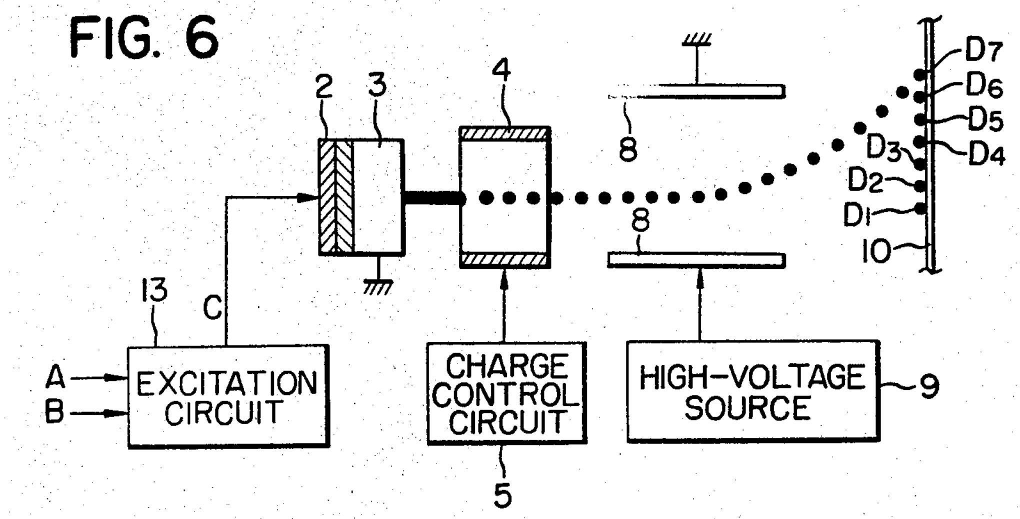
FIG. 6 is a diagrammatic view of the first embodiment of the present invention.

In FIG. 6 is shown an ink-jet printer incorporating the excitation circuit 13 described above. The mode of operation is apparent from the above description so that no further description shall be made in this specification.

The first embodiment of the present invention described above is advantageous over the prior art charge-controlled type ink-jet printers in that the phase detection electrode 6, the phase detection circuit 7 and the gutter 11 (See FIG. 1) may be eliminated. However in the first embodiment the ink drops are issued only on demand so that the charge on each ink drop imparted by the charge electrode which is impressed with a constant charging voltage, varies from one ink drop to another. That is, the charge on an ink drop immediately succeeding the preceding ink drop is lower then the charge on an ink drop which has no preceding ink drop. As a result the misplacements of ink drops inevitably result as will be described below with reference to FIG. 7.

Figure 7:
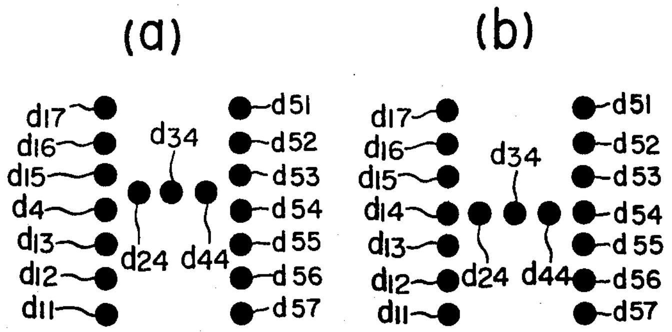
FIG. 7(*a*) is a view used for the explanation of the misplacement of ink drops due to the alteration of the intended trajectories of ink drops due to the interactions between nearby ink drops.

In FIG. 7(*a*) is shown a character H printed by the first embodiment of the present invention. In contrast with the ink drops which were successively formed and deflected to land at the successive dot positions $d_{11}$–$d_{17}$ of the first and fifth vertical lines, the ink drops which were placed at the dot positions $d_{24}$, $d_{34}$ and $d_{44}$ in the fourth row from the bottom in the second, third and fourth vertical lines or columns had no preceding ink drop so that they were more charged and consequently more deflected. As a result, the ink dots in the fourth row are misaligned.

This misalignment problem may be overcome in a manner described below. That is, during the formation or printing of one character, ink drops and continuously formed so that they may be equally charged; that is, every ink drop has its own preceding ink drop as will be described in more detail below.

Second Embodiment, FIGS. 7, 8, 9 and 10

Figure 8:
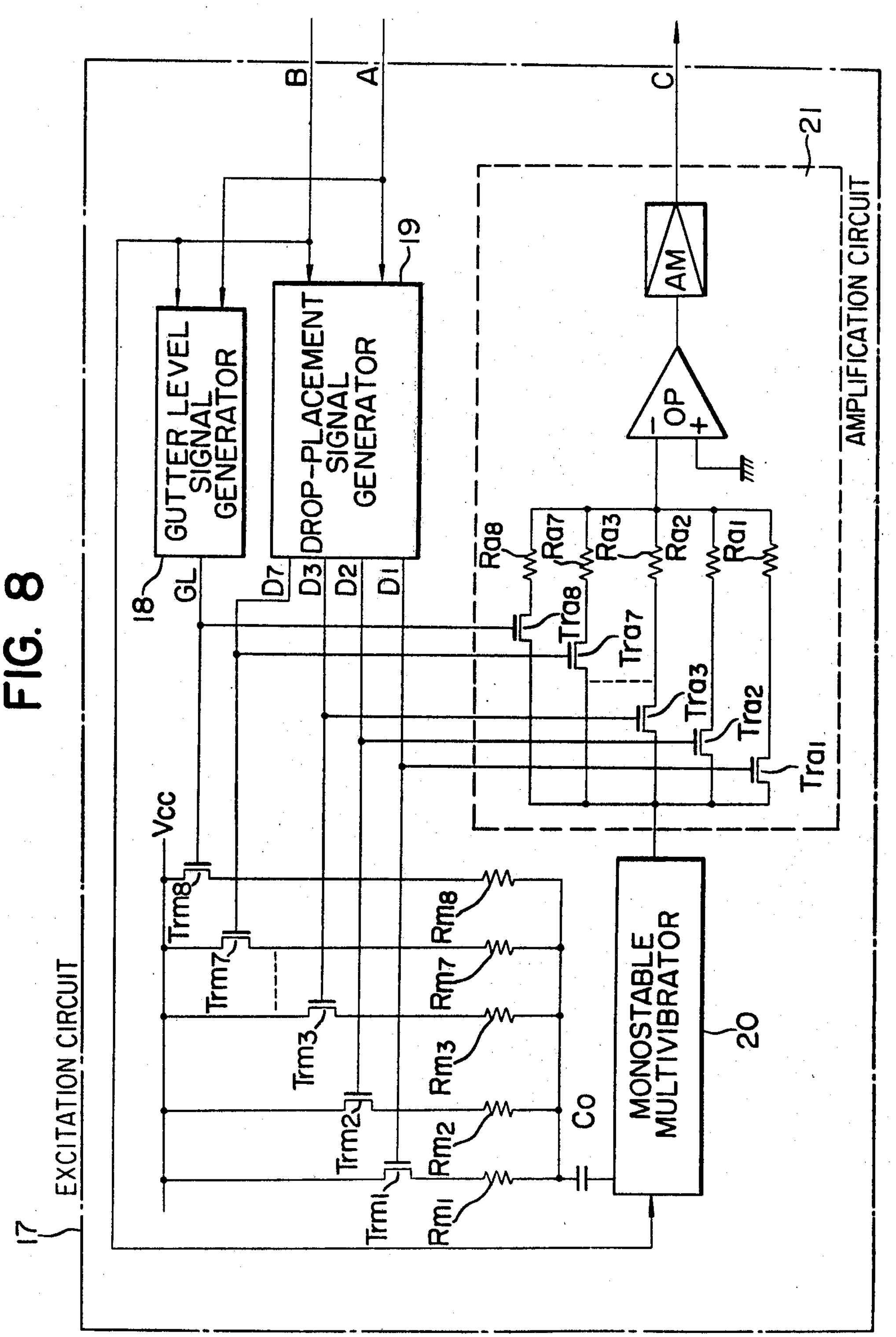
FIG. 8 is a diagram of an excitation circuit used in the second embodiment of the present invention.
Figure 9:
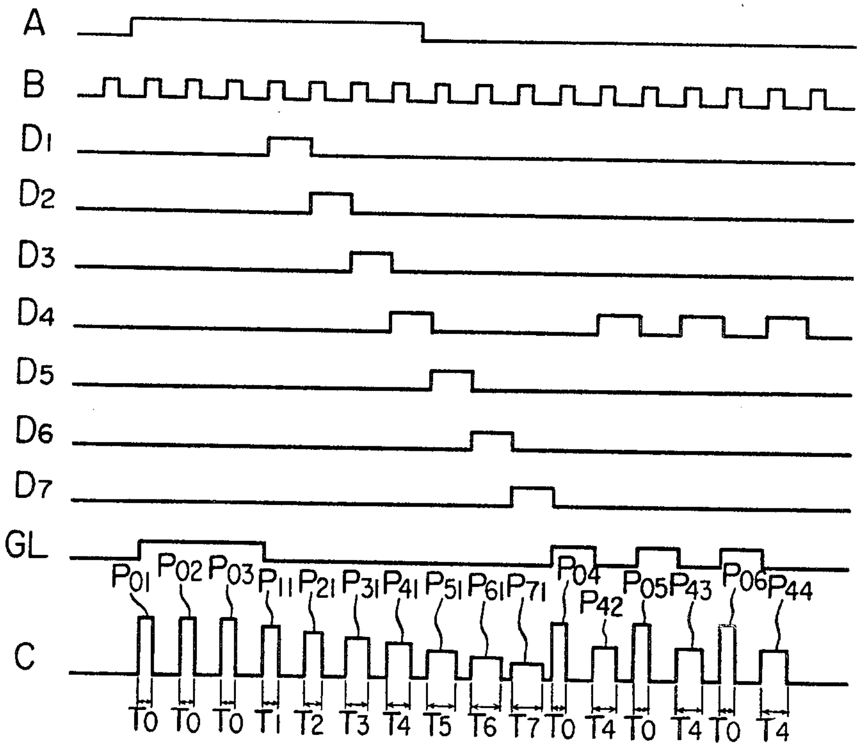
FIG. 9 shows the waveforms of various signals processed in the excitation circuit shown in FIG. 8.

In FIG. 8 is shown another embodiment of an excitation circuit which, as in the case of the first embodiment, may cause the piezoelectric crystal to vibrate so that the ink drops issued through the nozzle of the ink drop generator 3 may have the same mass and may be imparted with predetermined velocities, whereby the charged ink drops may be placed on the predetermined positions on the recording paper 10. The excitation circuit 17 has a gutter-level signal generator 18 and a drop-placement signal generator 19 both of which receive the character formation signal A (See FIG. 9, A) and the print pulses B (See FIG. 9, B). In response to the signals A and B, the gutter-level signal generator 18 delivers the pulse output GL (See FIG. 9, GL) to analog switches $Trm_8$ and $Tra_8$ in synchronism with the print pulses B so that the analog switches $Trm_8$ and $Tra_8$ are opened. In like manner, the drop-placement signal generator 19 delivers the output pulses $D_1$–$D_7$ (See FIG. 9, $D_1 \ldots D_7$) sequentially in synchronism with the print pulses B in order to place the ink drops at the dot positions $D_{11}$–$D_{17}$ in the first vertical line or column of the dot matrix for printing the character H shown in FIG. 7(*b*). The pulse signals $D_1$–$D_7$ are sequentially applied to the first and second analog switches $Trm_1$–$Trm_7$ and $Tra_1$–$Tra_7$ so as to open them sequentially. The monostable multivibrator 20 is connected through the capacitor $C_0$ and the resistors $Rm_1$–$Rm_8$ to the first analog switches $Trm_1$–$Trm_8$ and generates a pulse signal whose pulse duration is dependent upon the value of the capacitor $C_0$ and the value of one of the resistors $Rm_1$–$Rm_8$ which is connected to an opened one of the analog switches $Trm_1$–$Trm_8$. The pulse signal is applied to the amplification circuit 21 which comprises the second analog switches $Tra_1$–$Tra_8$, the weighting resistors $Ra_1$–$Ra_8$, the operational amplifier OP and the amplifier AM. The weighting resistors $Ra_1$–$Ra_8$ are used to adjust the amplitudes of the pulse signals from the multivibrator 20. Thus the amplification circuit 21 delivers the exciting signals to the piezoelectric crystal 2 as shown in FIG. 9, C.

In summary, the pulse width of the exciting signal is determined by the values of the capacitor $C_0$ and one of the resistors $Rm_1$–$Rm_8$ while the amplitude of the exciting signal is determined by one of the resistors $Ra_1$–$Ra_8$. Therefore the ink drops issued from the ink drop generator 3 may have the same mass and may be imparted with the predetermined velocities depending upon the dot positions at which they are to be placed.

More specifically, in response to the pulse signal (See FIG. 9, GL) delivered from the gutter level signal generator 18 in synchronism with the print pulses B, the amplification circuit 21 delivers three gutter-level signals $P_{01}$–$P_{03}$ with the pulse duration $T_0$ (shown in FIG. 9, C) to the piezoelectric crystal 2. As a result, the ink drops issuing from the ink drop generator 3 are steered toward a gutter 22 (See FIG. 10) and consequently given points on the recording paper left blank. In response to the pulse signal $D_1$ from the drop-placement signal generator 19 delivered in synchronism with the print pulses B, the amplification circuit 21 delivers to the piezoelectric crystal 2 the exciting signal $P_{11}$ which is wider in the pulse duration and is slightly lower in amplitude than the gutter level signals $P_{01}$–$P_{03}$. As a result the ink drop issued from the ink drop generator 3 is steered to be placed at the dot position $d_{11}$ in the first vertical line or column of the dot pattern of the character H shown in FIG. 7(*b*). In like manner, in response to the pulse signals $D_2$–$D_7$, the amplification circuit 21 delivers to the piezoelectric crystal 2 the exciting signals $P_{21}$–$P_{71}$ sequentially so that the ink drops issued from the ink drop generator 3 are steered to be placed at the dot positions $d_{12}$–$d_{17}$ in the first vertical line or column of the dot pattern of the character H shown in FIG. 7(*b*).

After the first vertical line or column has been printed in the manner described, the gutter level signal $P_{04}$ is generated while the print head is displaced horizontally for one dot distance. In response to the output pulse $D_4$ from the drop-placement signal generator 19, the amplification circuit 21 delivers to the piezoelectric crystal 2 the exciting signal $P_{42}$ (shown in FIG. 9, C) so that the ink drop issued from the drop generator 3 is steered to be placed at the dot position $d_{24}$ in the second vertical line or column of the dot pattern H in FIG. 7(*b*). In like manner, ink drops are placed at the dot positions $d_{34}$ and $d_{44}$ in the third and fourth vertical lines of columns. The ink drops are placed successively at the dot positions $d_{51}$–$d_{57}$ in the fifth vertical line or column in a manner substantially similar to that described above in conjunction with the printing of the first vertical line or column. Thus the character H is printed.

The number of ink drops which precede the ink drop to be placed on the recording paper and are steered toward the gutter 22 is dependent upon the frequency of the exciting signal applied to the piezoelectric crystal 2. That is, in response to the frequency of the pulse signal applied to the crystal 2, the ink drop spacing varies. The number of the ink drops preceding the ink drop to be placed is varied from a few to several.

Figure 10:
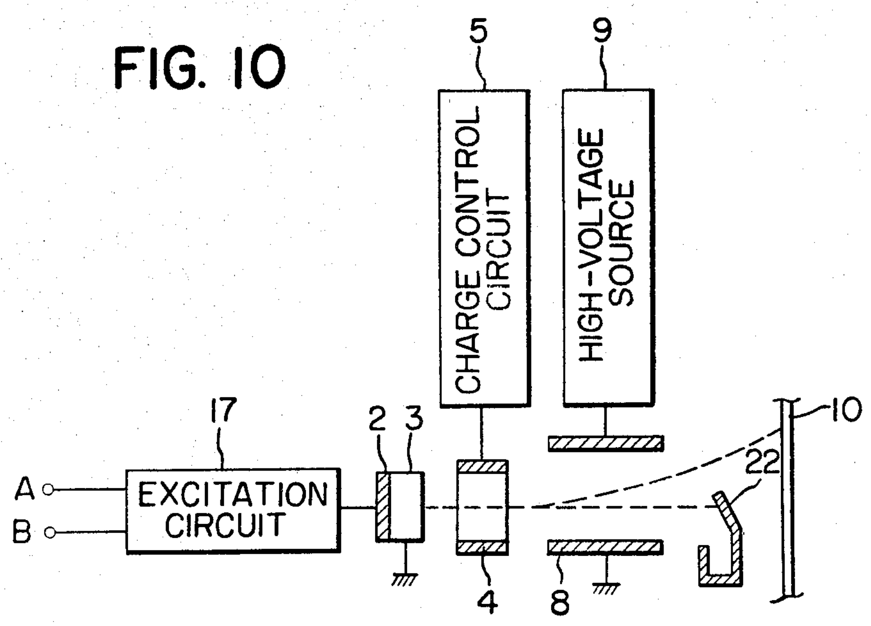
FIG. 10 is a diagrammatic view of the second embodiment of the present invention.

The operation of the circuit in FIG. 10 is nearly same as that of FIG. 6, but the gutter is provided and the excitation circuit 17 is different from the excitation circuit 13 in FIG. 6. Therefore, the detail explanation as to FIG. 10 is omitted.

In summary, according to the second embodiment of the present invention, at least one ink drop precedes an ink drop to be placed on the recording paper and a stream of ink drops is continuously generated every time when one character is being printed. Therefore misplacements of ink drops which result from the first embodiment as described elsewhere may be eliminated. Furthermore the second embodiment is advantageous in that the quantity of ink drops steered to the gutter may be minimized because only a few ink drops issue from the ink drop generator during the shift of the print head; that is, between the adjacent characters.

Figure 12:
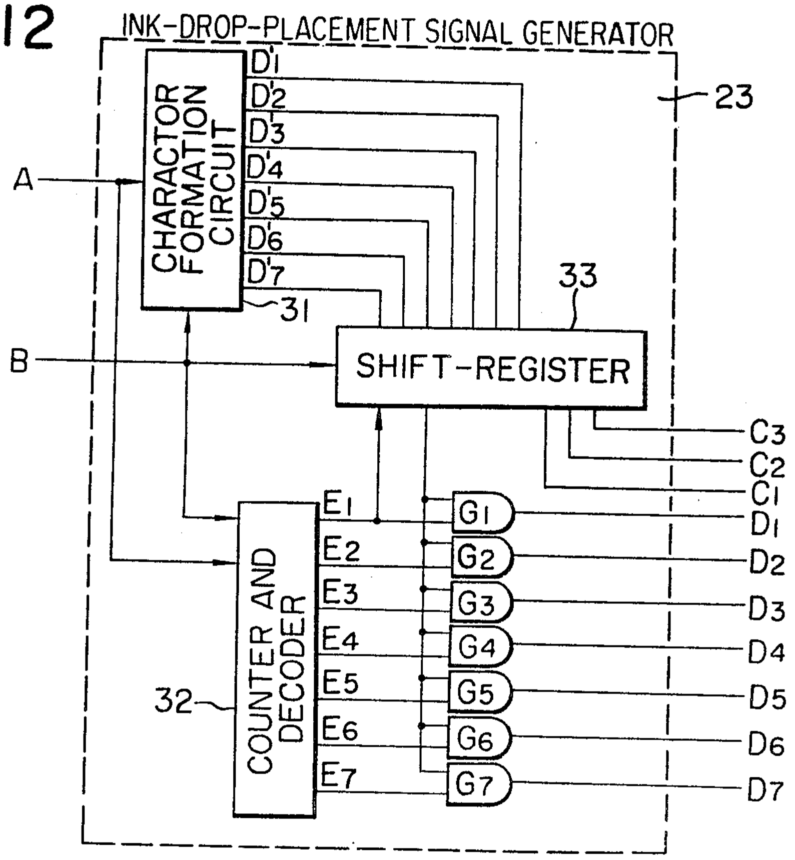
FIG. 12 is a block diagram of a drop-placement signal generator used in the third embodiment of the present invention.
Figure 11:
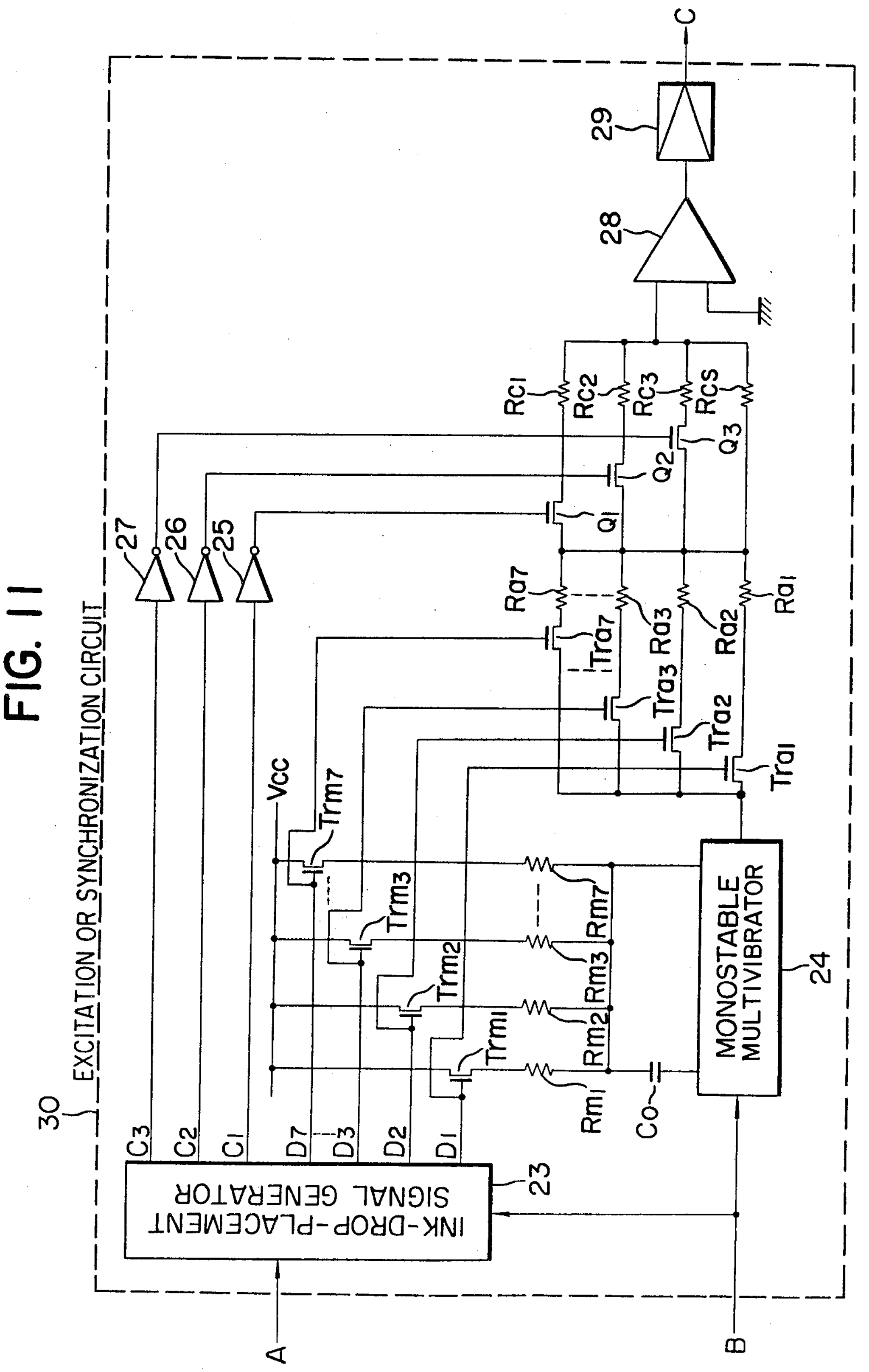
FIG. 11 is a diagram of an excitation circuit used in a third embodiment of the present invention.

Third Embodiment, FIGS. 11 and 12

The third embodiment was made in order to overcome the problems encountered in the first embodiment. That is, the velocity of the ink drop succeeding the preceding ink drop is slowed down as compared with that of the ink drop which has no preceding ink drop so that a time required for the ink drop passing through the charge electrode may be increased and consequently the misplacements of ink drops due to the variations in charge on the ink drops may be avoided.

In FIG. 11 is shown a diagram of an excitation circuit used in the third embodiment of the present invention. The excitation circuit generally indicated by the reference numeral 30 has an ink-drop-placement signal generator 23, a monostable multivibrator 24, NOT circuits 25, 26 and 27, an operational amplifier 28, a power amplifier 29, analog switches $Trm_1$–$Trm_7$ and their associated resistors $Rm_1$–$Rm_7$ and capacitor $C_0$, analog switches $Tra_1$–$Tra_7$ and their associated resistors $Ra_1$-–$Ra_7$ and transistors $Q_1$–$Q_3$ and their associated resistors $Rc_1$–$Rc_3$ and Rcs.

In response to the character formation signal A and the print pulses B, the ink-drop-placement signal generator 23 delivers the output pulses $D_1$–$D_7$ in synchronism with the pring pulses B so that the analog switches $Trm_1$–$Trm_7$ and $Tra_1$–$Tra_7$ are opened. The monostable multivibrator 24 delivers a pulse signal whose pulse duration is dependent upon the value of the capacitor $C_0$ and the value of one of the resistors $Rm_1$–$Rm_7$ which is connected to an opened one of the analog switches $Trm_1$–$Trm_7$. The pulse signals from the monostable multivibrator are delivered to the operational amplifier 28 through the analog switches $Q_1$–$Q_3$, resistors $Ra_1$-–$Ra_7$, transistors $Trc_1$–$Trc_3$, and resistor $Rc_1$–$Rc_3$ and Rcs. The resistors $Rm_1$–$Rm_7$ and $Ra_1$–$Ra_7$ are weighted, respectively. Thus the time constant of the monostable multivibrator is dependent upon the value of the capacitor $C_0$ and the value of that one of the resistors $Rm_1$–$Rm_7$ which is electrically connected to the monostable multivibrator 24 so that the pulse duration of the output pulse is dependent upon the time constant of the monostable multivibrator 24. The resistors $Ra_1$–$Ra_7$ are used to adjust the amplitudes of the pulse outputs from the monostable multivibrators 24 as in the case of the first embodiment. The above mode of operation is substantially similar to that of the first embodiment.

In response to the dot-placement signal $D_3$ from the drop-placement signal generator 23, the analog switches $Trm_3$ and $Tra_3$ are opened so that the power amplifier 29 delivers to the piezoelectric crystal 2 the exciting signal whose pulse duration is dependent upon the value of the capacitor $C_0$ and the value of the resistor $Rm_3$ and whose amplitude is dependent upon the values of the resistors $Ra_3$, $Rc_1$–$Rc_3$ and Rcs. When the ink drop issued in response to the ink-drop-placement signal $D_3$ is immediately following the preceding ink drop which has been issued for instance in response to the drop-placement signal $D_2$, a high-level correction signal appears at the output terminal $C_1$ of the ink-drop-placement signal generator 23 and is inverted by NOT gate 25 and applied to the transistor $Q_1$. The transistor $Q_1$ is therefore disabled so that the combined resistance of the resistors $Rc_1$–$Rc_3$ and Rcs rises as compared with the case when there exists no preceding ink drop. As a result the exciting signal C is decreased in amplitude and consequently the velocity of the ink drop becomes slower. Since the deflection of the charged ink drop is in inverse proportion to the square of its velocity, the lower the velocity of an ink drop, the greater the deflection becomes. Thus the decrease in deflection due to the decrease in charge on an ink drop caused by the preceding ink drop may be compensated for. In like manner, when there exists one-ink-drop spacing, the high-level compensation signal appears at the output terminal $C_2$ while when there exists a two-ink-drop-spacing, the high-level compensation signal appears at the output terminal $C_3$. In response to these signals, the amplitude of the exciting signal to be applied to the piezoelectric crystal is adjusted so that the velocity of an ink drop spaced apart by one- or two-ink-drop spacing from the preceding ink drop may be adjusted and consequently its deflection may be compensated thereby. It is to be understood that the distance between the preceding ink drop and an issuing ink drop whose velocity must be adjusted is not limited. However the experiments showed that the compensation of the deflection drop is satisfactory in practice up to three-ink-drop spacing.

In FIG. 12 is shown in detail the ink-drop-placement signal generator 23 comprising a character formation circuit 31, a counter and decoder 32, a shift register 33 and AND gates $G_1$–$G_7$.

In response to the character formation signal A, the character formation circuit 31 delivers the drop-placement signals $D'_1$–$D'_7$ and simultaneously the counter and decoder circuit 32 starts counting the print pulses B. In response to the output $E_1$ from the counter-decoder 32, the drop-placement signals $D'_1$–$D'_7$ are loaded into the shift register 33 and the contents of the shift register 33 is shifted in response to the print pulses B. The 7-th bit output from the shift register 33 is applied to one input terminal of each of AND gate $G_1$–$G_7$ the other input terminals of said gates being connected to the output terminals $E_1$–$E_7$ of the counter-decoder 32, respectively. Therefore the 7-th bit output from the shift register 33 and hence the drop-placement signal $D'_1$ from the character formation circuit 31 is delivered as the output pulse $D_1$ through the first AND gate $G_1$. In response to the next print pulse, the contents in the shift register 33 is shifted by one bit and simultaneously the counter-decoder 33 delivers its output to the output terminal $E_2$ so that the drop-placement signal $D'_2$ from the character formation circuit 31 is delivered as the output $D_2$ through the second AND gate $G_2$. In this case, the drop-placement signal $D'_1$ is shifted to the output terminal $C_1$ of the shift register 33 at which the 8-th bit output appears. That is, when the drop-placement signal $D'_1$ exists, a high-level voltage signal appears at the terminal $C_1$, but when no drop-placement signal $D'_1$ exists, a low-level voltage signal appears. In like manner, in response to one print pulse B, the contents in the shift register 33 is shifted by one bit and the drop-placement signals $D_1$–$D_7$ are delivered sequentially through the AND gates $G_1$–$G_7$. When an ink drop which is issuing from the ink drop generator immediately follows the preceding ink drop, the high-level voltage signal appears at the terminal $C_1$. In like manner, depending upon the spacing; that is, one-drop or two-drop spacing between the preceding ink drop and an ink drop which is issuing from the ink drop generator, the high-voltage signal appears at the output terminal $C_2$ or $C_3$. In response to the high-voltage signal which appears at the output terminal $C_1$, $C_2$ or $C_3$, the velocity of the ink drop which is emerging is adjusted as described elsewhere with reference to FIG. 11.

As described above, according to the third embodiment of the present invention, the variations in charge on ink drops due to the spacing to the preceding ink drop may be eliminated and consequently misplacements of ink drops may be avoided, whereby high quality printing may be obtained.

What is claimed is:

1. A deflection type ink-jet printer, comprising:

an ink drop generator for ejecting a stream of ink drops;

means for supplying ink to said generator;

velocity modulation means mounted on said generator for varying the velocity of ink-drops ejected from said generator in accordance with the pulse width—pulse amplitude product of a pulsed excitation signal;

means for charging the ink drops ejected from said generator;

means for deflecting the ink drops charged by said charging means, the amount of deflection being dependent upon the velocity with which said ink drops are ejected from said generator, the amount of deflection therefore being dependent upon the pulse width—pulse amplitude product of said pulsed excitation signal; and signal generating means for generating said pulsed excitation signal and for varying the pulse width—pulse amplitude product of said signal, and thus the ink drop velocity, in accordance with the desired ink drop print pattern and with the presence or absence of an immediately preceding ink drop.

* * * * *